United States Patent [19]
Hartman et al.

[11] Patent Number: 4,682,456
[45] Date of Patent: Jul. 28, 1987

[54] CELLULAR FLOORING SYSTEM AND METHOD OF USING SAME

[75] Inventors: Thomas W. Hartman, Pittsburgh; Thomas G. Ryan, Bethel Park, both of Pa.

[73] Assignee: Cyclops Corporation, Pittsburgh, Pa.

[21] Appl. No.: 829,911

[22] Filed: Feb. 18, 1986

Related U.S. Application Data

[63] Continuation of Ser. No. 517,366, Jul. 26, 1983, Pat. No. 4,593,506, which is a continuation-in-part of Ser. No. 441,052, Nov. 12, 1982, abandoned.

[51] Int. Cl.$^4$ .............................................. E04B 5/48
[52] U.S. Cl. ........................................ 52/221; 174/48; 174/95; 138/116
[58] Field of Search .................... 52/220, 221, 336; 174/48, 49, 95–97; 138/111, 115, 116, 117; 138/92

[56] References Cited

U.S. PATENT DOCUMENTS

| | | | |
|---|---|---|---|
| 1,113,560 | 10/1914 | Gordon | 138/116 |
| 2,073,490 | 3/1937 | Lewin | 247/3 |
| 2,090,483 | 8/1937 | Mendez | 72/70 |
| 2,762,398 | 9/1956 | Adam | 138/75 |
| 2,911,898 | 11/1959 | Curran | 98/31 |
| 2,912,848 | 11/1959 | Lee et al. | 72/16 |
| 2,930,504 | 3/1960 | Hudson | 220/3.4 |
| 3,074,208 | 1/1963 | Seidel | 52/221 |
| 3,082,504 | 3/1963 | Tatsch | 264/31 |
| 3,093,933 | 6/1963 | Slinghuff | 52/221 |
| 3,338,450 | 8/1967 | Rose | 220/3.94 |
| 3,420,017 | 1/1969 | Brugger et al. | 52/221 |
| 3,420,018 | 1/1969 | Fork | 52/221 |
| 3,426,802 | 2/1969 | Fork | 138/92 |
| 3,459,875 | 8/1969 | Fork | 174/97 |
| 3,592,956 | 7/1971 | Fork | 174/49 |
| 3,715,844 | 2/1973 | Breading | 52/221 |
| 3,721,051 | 3/1973 | Fork | 52/173 |
| 3,793,793 | 2/1974 | Dobbins | 52/221 |
| 3,851,674 | 12/1974 | Fork | 138/173 |
| 3,873,136 | 3/1975 | Curry | 285/189 |
| 3,886,702 | 6/1975 | Fork | 52/221 |
| 3,903,666 | 9/1975 | Fork | 52/221 |
| 4,030,259 | 6/1977 | Meckler | 52/221 |
| 4,125,977 | 11/1978 | Michlovic | 52/220 |
| 4,178,469 | 12/1979 | Fork | 174/48 |
| 4,194,332 | 3/1980 | Fork | 52/220 |
| 4,232,493 | 11/1980 | Gray et al. | 52/221 |
| 4,240,688 | 12/1980 | Sotolongo | 339/122 F |
| 4,250,675 | 2/1981 | Meckler | 52/221 |
| 4,297,524 | 10/1981 | Fork | 174/48 |
| 4,338,484 | 7/1982 | Littrell | 174/48 |
| 4,366,341 | 12/1982 | van Riet | 174/48 |
| 4,438,785 | 3/1984 | Morrison et al. | 138/103 |
| 4,453,349 | 6/1984 | Ryan | 52/28 |
| 4,454,692 | 6/1984 | Ault | 52/221 |
| 4,465,897 | 8/1984 | Albrecht | 174/48 |

FOREIGN PATENT DOCUMENTS

| | | | |
|---|---|---|---|
| 246826 | 5/1966 | Austria | |
| 572685 | 10/1945 | United Kingdom | 52/221 |
| 2015268A | 9/1979 | United Kingdom | 174/48 |
| 1583946 | 2/1981 | United Kingdom | 174/48 |
| 2141464A | 12/1984 | United Kingdom | |

Primary Examiner—John E. Murtagh
Assistant Examiner—Andrew Joseph Rudy
Attorney, Agent, or Firm—Thomas R. Shaffer

[57] ABSTRACT

An improved cellular flooring service distribution system is disclosed comprising a cellular flooring unit in which a dividing means provides a plurality of open parallel conduits in a single valley of a corrugated sheet, an overlying trench providing a plurality of transversely oriented parallel passageways which have access to said conduits and an isolating means to selectively isolate at least one conduit and passageway from the remaining conduits and passageways. Cover means and access housings are also provided. Since the above components do not require any special fabrication, they can be efficiently and cheaply mass produced, preferably from sheet metal. Service lines may be placed in open conduits and passageways prior to covering to eliminate the need for feeding the lines through enclosed cells. Since no base plate is required on the corrugated sheets, less material is used than with conventional units, the sheet can be compactly nested to facilitate shipping and handling and fire resistance is increased. Fire resistance is further increased by allowing concrete to flow beneath the trench into the undivided valleys of the sheet. Various embodiments of the general concept are disclosed.

8 Claims, 13 Drawing Figures

CELLULAR FLOORING SYSTEM AND METHOD OF USING SAME

This application is a continuation of our copending application Ser. No. 517,366, filed July 26, 1983 which in turn is a continuation-in-part of application Ser. No. 441,052, filed Nov. 12, 1982, now abandoned.

This invention relates to a new and improved underfloor wiring system which isolates one or more distribution channels from remaining channels. More specifically, a service distribution system is disclosed which comprises a relatively small number of standard components which can be easily assembled and placed at a job site without regard to placing each individual piece according to a pre-conceived floor plan. A corrugated metal sheet having alternating valleys and crests is provided wherein any of said valleys can be easily and efficiently sectioned into a plurality of wiring raceways or conduits. An overlying trench and associated isolating means provides transversely oriented passageways and allows for free access between selected conduits and passageways.

It is well known in the art to utilize a corrugated metal sheet having alternating valleys and crests connected by inclined webbing in conjunction with an attached lower metal plate to create a plurality of spaced, parallel conduits or cells. The cells are used to receive service lines (e.g. power, electronics, communication and the like). It is also well known that separation of these services is highly desirable, both for safety reasons and so that each can be separately maintained without risk of interference with the others. In addition to providing a separate conduit for each service, it is also highly desirable to provide access to all the services at one location. Further, providing an overlying trench having transversely oriented passageways which are connected with the conduits in a manner so that certain conduit-passageway channels are isolated from other such channels is also desirable for reasons listed below.

Finally, it is highly desirable to surround channels containing high voltage lines or other potentially heat generating service lines with as much concrete as possible to increase the fire resistant qualities of an entire structure This goal has not been addressed or achieved by any known prior art devices There have been many attempts to achieve the above-mentioned goals but all have a number of shortcomings. U.S. Pat. Nos. 3,303,264, 3,417,191 and 3,932,696 represent devices in which two parallel cells can be accessed by a single access housing. A problem with those devices is that they are not adaptable for uses where more than two services are required. Additionally, each of those devices requires access openings in the corrugated sheet which reduces the structural integrity of the flooring.

One solution to the need for additional cells is disclosed in U.S. Pat. Nos. 3,592,956 and 4,194,332. Those patents describe a typical corrugated sheet having crests, valleys and a base plate which is modified by providing a cover over selected valleys to create additional cells. The problems remain, however, of obtaining access to the original crest cells without punching holes into the corrugated sheet and of providing a number of cells in a relatively small space.

Another known solution provides additional cells at predetermined locations by providing a smaller crest having vertical sidewall webbing rolled into a valley of the sheet between two adjacent crests. Openings are provided in the smaller central crest and in the inclined webbing of each adjacent crest to provide access at a single location. A problem with that system is that each piece must be properly cut and positioned so as to line up the smaller crest. Also, there are often many leftover pieces when the sheets are cut because of the irregular pattern of crests and valleys in the corrugated sheets.

U.S. Pat. No. 3,721,051 discloses a bottomless trench assembly which isolates the cell-passageway channels from other such channels. However, since the trench has no base, time consuming barriers must be added along the side rails of the trench to prevent concrete from flowing through the valley portions of a corrugated sheet into the trench passageways. additionally, the service lines are placed directly on the crest portions of the corrugated sheet and which offers little resistance to fire.

In addition to the problems mentioned above, the references cited above utilize a base plate secured under the corrugated sheet which transforms each crest into an enclosed conduit or cell. In use, the conventional corrugated cellular raceway units are secured in place and a layer of concrete is poured over them. Service lines are then, typically, fed into the cells through access housings left at pre-determined locations in the concrete. The insulating covers on the lines, or even the lines themselves, are sometimes damaged in the feeding process by being pulled across sharp metal edges. Additionally, the feeding process is a tedious and time consuming process which tends to unnecessarily increase building costs.

Fabrication costs are increased by the necessity of providing knock-out plugs or having openings punched at differing predetermined locations on various corrugated sheets. The provision of plugs and openings at precise locations requires each sheet to be punched according to its particular position on a floor plan. The sheets must be individually placed according to the plan and when the sheets are inadvertently mixed up, time consuming on-site adjustments must be made. Also, the delay in shipment of any single sheet may halt the progress of an entire operation.

We provide an improved cellular flooring system in which a corrugated metal sheet having alternating valleys and crests connected by a webbing or any suitable sheet having at least one valley portion is utilized in such a way that no access holes or openings are required in the sheet. This preserves the strength of the metal sheet and eliminates the need for special punching of each sheet. We provide cells which are formed exclusively out of the valleys rather than the crests. We further provide a corrugated sheet which requires no attached lower base sheet of metal to reduce the amount of material required for a given job. We further provide corrugated sheets which may be compactly nested to facilitate shipping and handling. We further provide corrugated sheets which require no access openings nor any special fabrication to preserve the strength of the sheets and to reduce their costs. We also prefer to provide corrugated sheets having a substantially symmetrical pattern of valleys and crests. We further provide corrugated sheets which can easily be positioned over an entire floor area with only preliminary information of where service lines will be required.

We prefer to form cells by supporting a "U" shaped dividing or separating member in the center of any valley to provide three open parallel conduits. Providing a cover means will produce three separate enclosed conduits or cells in any single valley. The cover means is supported by the crest portions of the corrugated sheet adjacent to the divided valley. If more than three cells are required a "W" shaped dividing member or several adjacent "U" shaped members can be utilized and if only two cells are required an "I" shaped member can be provided.

We also prefer to provide an overlying trench comprised of a plurality of vertical wall members having a base sheet attached thereto to form a plurality of passageways oriented transversely with respect to the conduits in the corrugated sheet. We prefer to provide a base sheet having a gap therein positioned over the divided valley or valleys in the sheet to allow unrestricted access between the conduits and passageways. We further prefer to provide isolating means to isolate at least one communicating passageway and conduit from the others. A cover is also provided for the trench.

We prefer to utilize a trench having a base sheet so that concrete can flow beneath the trench into the undivided valleys in the corrugated sheet thereby providing a structure of greater strength and one which offers greater resistance to fires.

We prefer to provide a trench which is manufactured in standard modular lengths which can be easily assembled and attached to the top of the corrugated sheets at the job site. We further prefer to provide an isolating means which locks the dividing or separating member of the corrugated sheet to the trench.

In one embodiment, we prefer to utilize an isolating means in the form of a cross-shaped plate member. Longitudinally extending portions of the plate provide a cover for the U-shaped dividing member in the gap area of the trench base and transversely extending portions provide a base in the gap area for a central trench passageway. An opening is provided in the center of the cross-shaped member to allow access between the isolated center conduit defined by the U-shaped members and the center trench passageway.

In construction, we prefer to first place corrugated sheets on the floor's supporting beams in a manner whereby the valleys open upwardly away from the supporting beams and the crests open downwardly toward the support beams. We prefer to provide identical sheets in modular lengths so that any individual sheet may be placed at any location without regard to a floor plan. The sheets are positioned end to end to provide a plurality of spaced-apart, continuous, parallel valleys across the floor. As the floor is closed in, it may be necessary to cut some of the sheets to the proper length. Next, we prefer to make a determination as to which valleys will be utilized as service raceways. Longitudinally extending dividing members are then placed end to end in the chosen valleys in order to create a plurality of open, parallel conduits in each of the chosen valleys. Dividing members can be designed to provide two or more conduits in any single valley and are preferably provided in modular lengths corresponding to the lengths of the corrugated sheets. We then prefer to attach a cross-shaped isolating member to the dividing member in the area where an overlying trench will be required. Then modular lengths of the trench are positioned and attached together so that the trench gap is aligned over the isolating member. The isolating member engages the interior wall members of the trench, thereby aiding in aligning it in its proper position and in securing it in place. If possible, we prefer to place all the service lines into their respective conduits and passageways before they are covered and a layer of concrete is poured over the sheet in order to eliminate the "feeding" process described above. We then prefer to provide access housings, also having isolated means, in desired locations and covers over the exposed portions of the divided valleys of the corrugated sheet thereby enclosing the service lines in their cells and passageways. A cover is only provided for those valleys being utilized as cells. Since no base sheets are provided on the corrugated sheets, trapping pockets of air in unused cells is prevented. By leaving the underside of the sheets exposed, heat can be swiftly radiated away from the sheets to the adjacent free flowing air, making the system less likely to fail in the event of a fire than a conventional cellular flooring unit. Access to the cells may be provided by utilizing either spaced-apart covers or covers having openings therein. No holes or openings are required in the corrugated sheet.

If service lines are not placed in the cells before they are enclosed, we prefer to place a string or wire in each conduit before it is covered to facilitate feeding the lines at a later time. The end of a service line is tied to the string or wire at one access opening and pulled through the enclosed cell from a second opening.

In another embodiment, we prefer to provide a corrugated metal sheet having generally alternating crests and valleys of equal width on one edge of the sheet, with the opposite edge of the sheet rolled to have a plurality of narrower crests therein. We prefer to provide a cover plate over the valleys between these narrower crests and on each side thereof to create a plurality of closed parallel cells. We prefer to provide the cells along an edge of the sheet to allow for easier matching of sheets should cutting of the sheets be required.

In the accompanying drawings we have illustrated certain present preferred embodiments of our invention in which.

Figure 1:
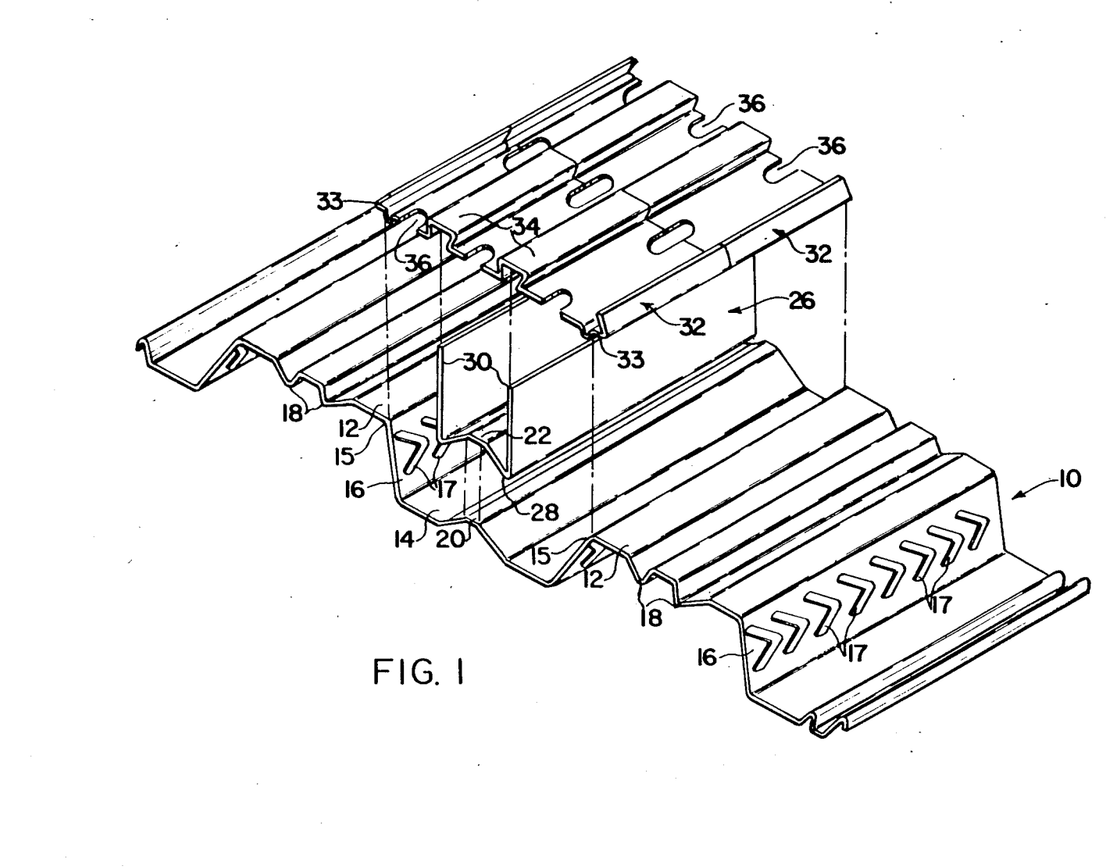
FIG. 1 is an isometric end view in exploded form showing a corrugated metal sheet, "U" shaped dividing member and cover means.
Figure 2:
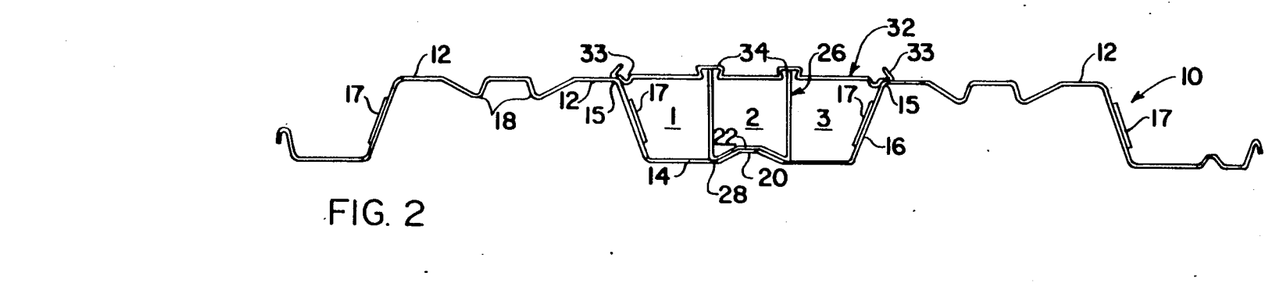
FIG. 2 is a cross-sectional view of the structure shown in FIG. 1 as assembled showing three separately enclosed cells formed from a single valley.

Referring specifically to FIGS. 1 and 2, a corrugated metal sheet 10 is provided. Sheet 10 is formed to have a symmetrical pattern of spaced-apart crests 12 and valleys 14 with inclined webbing 16 connecting adjacent valleys and crests. We prefer to roll shallow valleys or stiffening ribs 18 in each crest 12 to provide greater stiffness in sheet 10. We also prefer to provide a plurality of embossments 17 on the inclined webbing 16 to provide greater mechanical retention with a layer of concrete (not shown) which is poured over the corrugated sheet 10. In the center of each valley 14 we prefer to provide a small ridge 20 to cooperate with a corresponding ridge 22 located on the base portion 28 of "U" shaped dividing or separating member 26. This arrangement provides one means for properly positioning dividing member 26 within valley 14.

Dividing member 26 is a "U" shaped channel having a base portion 28 and two substantially vertical wall portions 30. Dividing member 26 can be fabricated out of any suitable material such as metal or plastic. Dividing member 26 can be secured to a valley 14 by any suitable means, such as self-taping screws or by locking it into an access housing (not shown), and serves to provide three open parallel conduits in any chosen valley. The height of the vertical wall portions 30 is preferred to be slightly greater than the depth of a valley 14.

In use, corrugated sheets 10 are positioned and connected together to form a sub-flooring supported by supporting beams. Once it is determined where service lines will be required, a separating or dividing member 26 is placed into the appropriate valley 14 or valleys. Once the separating member 26 is in place, the valley will contain three parallel conduits 1, 2 and 3 having open top surfaces. At this point in time it is preferred to place all of the service lines carefully into their selected conduits. This process is far more efficient than "feeding" and pulling the lines through enclosed cells as is the current practice. If the lines are not placed prior to enclosing the cells, we prefer to place strings to facilitate the feeding process when the lines are required. An access housing may then be placed over each access location. As mentioned, the access housing may be utilized as a means to secure the dividing member and covers to the sheet.

Figure 5:
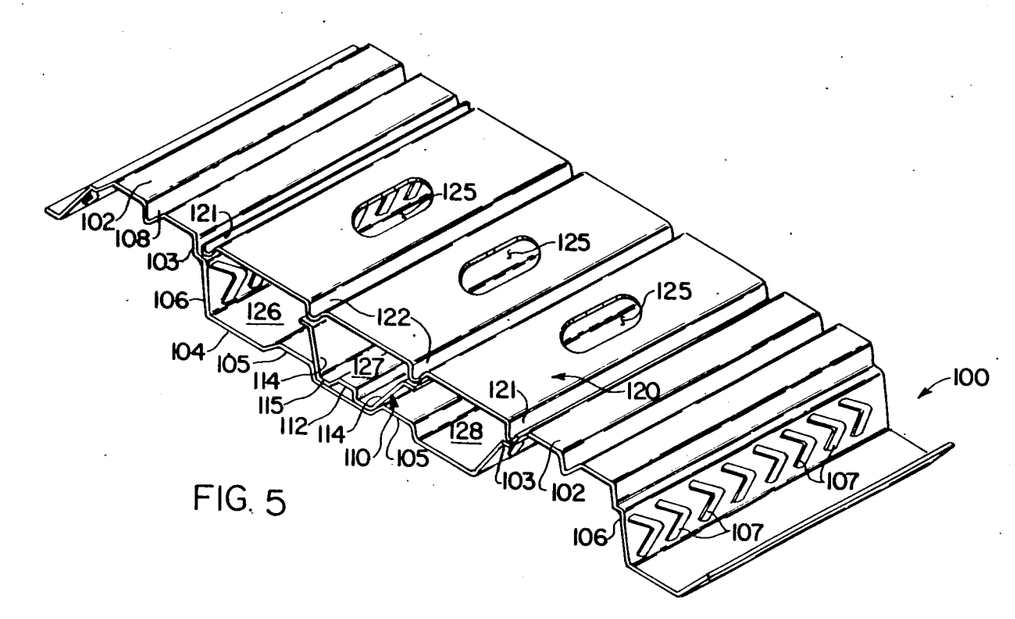
FIG. 5 is an isometric view of a sheet having a wide valley to provide cells with larger cross-sectional areas.
Figure 7:
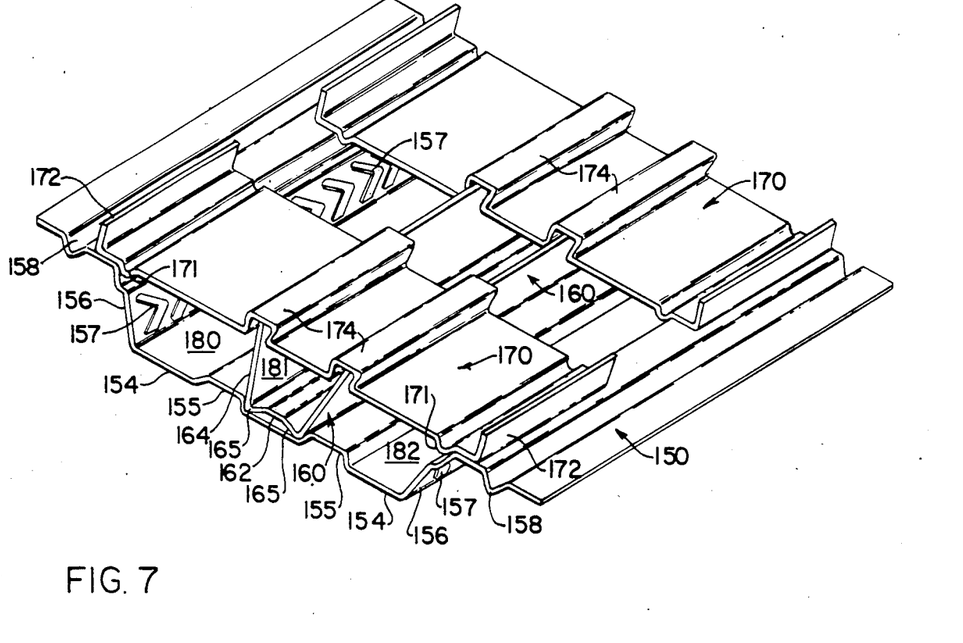
FIG. 7 is an isometric view of a sheet having a single valley and spaced-apart covers.

A cover 32 fabricated from any suitable material is provided to enclose the lines or strings in their respective cells 1, 2 and 3. In this embodiment, we prefer to provide a cover having two elevated offsets 34 to receive the wall portions 30 of separating member 26 when assembled. This arrangement provides another means for properly positioning dividing member 26 within valley 14. Offsets 34 also serve to increase the stiffness of the cover. The edges 33 of cover 32 are supported by edges 15 of the crest 12 located on each side of the valley 14 chosen as a service raceway. Access to the cells can be provided in any of a number of ways. One way is to provide cover sheets 32 having generally semi-circular cut outs 36 on their front and rear edges so that circular and oval access openings to cells 1, 2 and 3 will be formed when two cover sheets are placed end to end as shown in FIG. 1. Alternatively, cover sheets may be provided having access openings therein as shown in FIG. 5 or openings may be provided between cover sheets as shown in FIG. 7. In each case, access to all of the adjacent cells 1, 2 and 3 is provided from a single localized region. No holes or openings are required in sheet 10. Finally, a layer of concrete is poured over sheets 10 and the covered cells to complete the floor.

Figure 3:
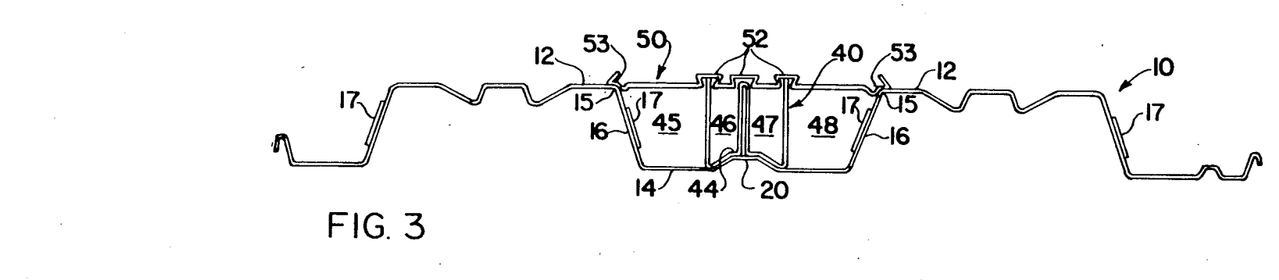
FIG. 3 is a cross-sectional view of another embodiment showing four separately enclosed cells formed by a "W" shaped dividing member.

Referring specifically to FIG. 3, a substantially "W" shaped separating or dividing channel 40 is provided to cooperate with valley 14 of corrugated sheet 10. Corrugated sheet 10 can be identical to the corrugated sheets shown in FIGS. 1 and 2. Ridge 20 is provided in sheet 10 to receive corresponding ridge 44 formed into the central portion of "W" shaped member 40 as shown. Once separating member 40 is in place, four open, parallel conduits 45, 46, 47 and 48 are formed. After service lines are placed, a cover 50 is provided to enclose the service lines into their respective cells. We prefer to provide a cover having edges 53 supported on the edges 15 of crests 12 and having three elevated offsets 52 to receive the wall portions of separating member 40 as shown. Access openings (not shown) can be provided in cover 50 in the same manner as described above or spaced-apart covers may be utilized.

Figure 4:
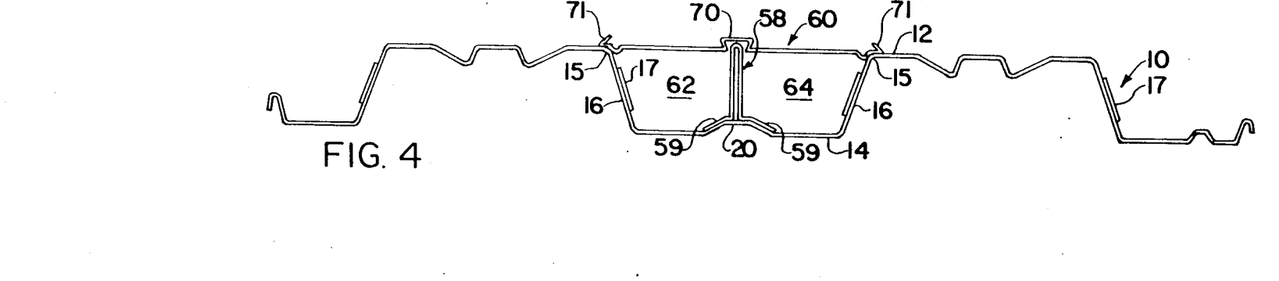
FIG. 4 is a cross-sectional view of yet another embodiment showing two separately enclosed cells formed by an "I" shaped dividing member.

In FIG. 4, an "I" shaped dividing member 58 is provided to create two parallel enclosed cells 62 and 64 out of valley 14 of corrugated sheet 10. Again corrugated sheet 10 is identical to the sheets shown in the previous figures. In this embodiment, the base portion 59 of dividing member 58 is formed to receive ridge 20 of valley 14. A cover 60 having edges 71 supported on edges 15 of crests 12 and having elevated offset 70 to receive member 58 is provided. Access openings (not shown) may also be provided FIG. 5 shows a sheet 100 rolled to have a plurality of spaced-apart parallel crests 102 and at least one valley 104 having a width greater than the width of said crests with inclined webbing 106 connecting adjacent crests and valleys. Embossments 107 are provided on the webbing 106 to increase the sheet's mechanical retention with a layer of concrete (not shown) which is poured over the sheet. We prefer to provide shallow valleys or stiffening ribs 108 in crests 102 to increase the stiffness of the metal sheet 100. We also prefer to provide a pair of spaced-apart ridges 105 in valley 104 to aid in aligning and securing a separating member to said valley. This arrangement provides yet another means for properly positioning a dividing member 110 within a valley 104.

In FIG. 5 a "U" shaped dividing member 110 is shown, but any of the above described separating members can be adapted for use with sheet 100. The base portion 115 and wall portions 114 of dividing member 110 are formed to fit securely between ridges 105 as shown. A ridge 112 is provided in the base portion 115 of the separating member 110 to provide adequate space for the member to be placed over a portion of corrugated sheet 100 which has been welded or bolted to a lower supporting beam. By providing a separating or dividing member in a relatively wide valley, cells having a larger cross-sectional area can be created for applications in which such added space is required.

A cover 120 is also provided having edges 121 supported on the edges 103 of crests 102. Shallow valleys or stiffening ribs 122 are provided to add stiffness to the cover 120 and to contact and seal dividing member 110, as shown to create three enclosed parallel cells 126, 127 and 128. Access openings 125 are provided in the cover 120 above each cell.

Figure 6:
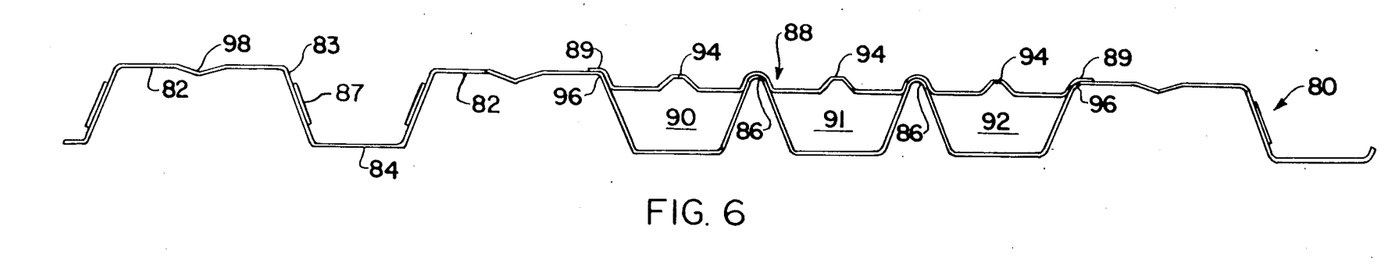
FIG. 6 is a cross-sectional view showing a sheet having a plurality of narrow crests at one end thereof and a cover means to utilize the valleys between and adjacent to said narrow crests as enclosed raceway cells.

In FIG. 6, a sheet 80 is provided having generally alternating crests 82 and valleys 84 of equal width on one edge of the sheet with the other edge of the sheet 80 having a plurality of narrower crests 86 therein. The valleys which form cells 90, 91 and 92 adjacent to narrower crests 86 provide open parallel conduits in a reduced space to receive a desired number of service lines. After the lines are placed, a cover 88 is secured over the valleys to create a plurality of enclosed parallel cellular raceways. Three such cells 90, 91 and 92 are shown in FIG. 6. Cover 88 is provided with a plurality of small crests or stiffening ribs 94 to increase the metal's stiffness and to receive crests or ribs 86 of corrugated sheet 80. Each end 89 of cover 88 is formed to receive the edge 96 of adjacent crests 82. Small valleys or stiffening ribs 98 are also provided in crests 82 to increase the stiffness of corrugated sheet 80 and embossments 87 in webbing 83 provide greater mechanical retention with a layer of concrete. In this embodiment of our invention, we prefer to provide the cells on one edge of corrugated sheet 80 to eliminate inadvertent cutting of the wrong side of the sheet 80 should cutting of the sheet be required to fill in floor space requiring less than the full width of a sheet.

FIG. 7 shows a sheet 150 having a single valley portion 154. The valley 154 is provided with a pair of spaced apart ridges 155 to aid in aligning and securing a separating member to the sheet. Embossments 157 are provided on the webbing 156 to increase the sheet's mechanical retention with a layer of concrete which is poured over the sheet. Shallow valleys or stiffening ribs 158 are provided in the sheet to increase the stiffness of the metal.

A "U" shaped dividing or separating member 160 is shown which separates valley 154 into three open parallel conduits. The base portion 165 and wall portions 164 of the separating member are formed to fit securely between ridges 155 as shown. A ridge 162 is provided in the base portion of the separating member 160 for the reasons discussed above (see description of FIG. 5).

Two cover sheets 170 are shown each having elevated offsets 174 to receive wall portions 164 of the dividing member. As a result, three enclosed cells 180, 181 and 182 are formed. Shallow valleys or stiffening ribs 171 are provided in cover sheets 170 to increase their stiffness. The outside edges 172 of cover sheets 170 are bent upwardly to allow for easy installation and removal. Access to the enclosed cells is permitted through an uncovered portion of the sheet 150 between the spaced-apart covers 170. An access housing is attached directly over this uncovered portion prior to the pouring of concrete over the sheet and covers.

Figure 8:
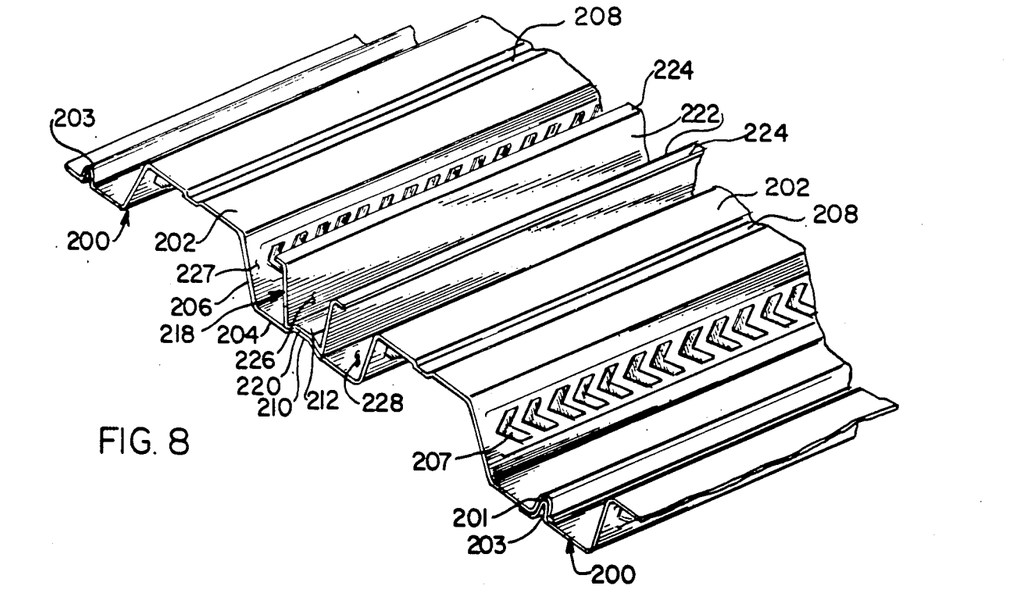
FIG. 8 is an isometric view of portions of two interconnected corrugated sheets and associated "U" shaped dividing member.

Referring specifically to FIG. 8, two corrugated sheets 200 are shown. Each sheet is formed to have a substantially symmetrical pattern of spaced-apart crests 202 and valleys 204 with inclined webbing 206 connecting adjacent valleys and crests. Shallow valleys or stiffening ribs 208 are provided in each crest portion 202 to increase stiffness of the sheets. Embossments 207 are provided on webbing 206 for reasons stated above and a ridge 210 is provided in the center of each valley 204 to cooperate with a corresponding ridge 212 located in the base portion of "U" shaped dividing member 218. An elevated offset 201 at one edge of a first sheet 200 is sized to receive a smaller offset 203 formed on the opposite end of a second sheet 200 thereby providing a means to interlock a plurality of sheets 200 together over the entire flooring area within a structure.

Dividing or separating member 218 is a "U" shaped channel having a base portion 220 and wall portions 222. The wall portions 222 are formed to have wings 224 extending outwardly therefrom. As will be described in greater detail below, extending wings 224 on separating member 218 are utilized to secure other components of the cellular flooring system together and to provide a central conduit 226, preferably utilized for electrical power, which has no exposed sharp metal edges which might cut into the power lines. Three conduits 226, 227 and 228 are formed into a single valley 204 when dividing member 218 is positioned therein.

Figure 9:
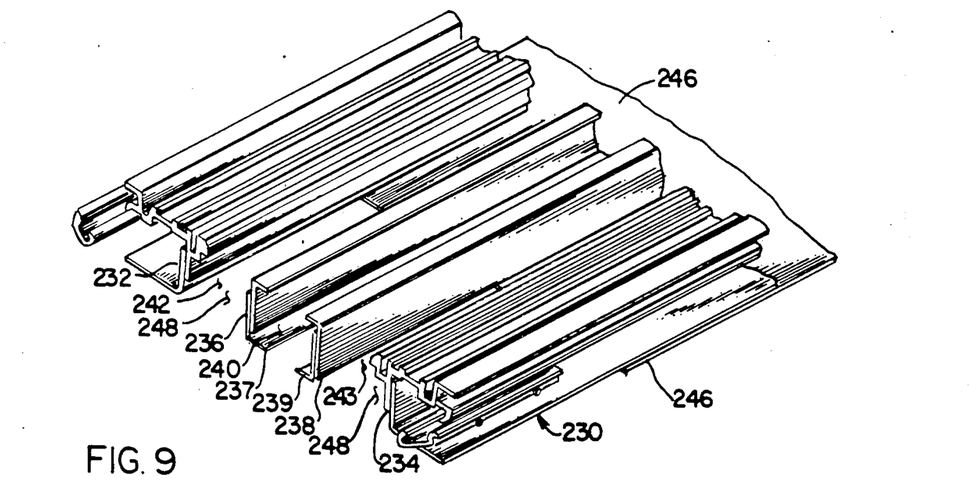
FIG. 9 is an isometric view of an overlying trench unit.
Figure 13:
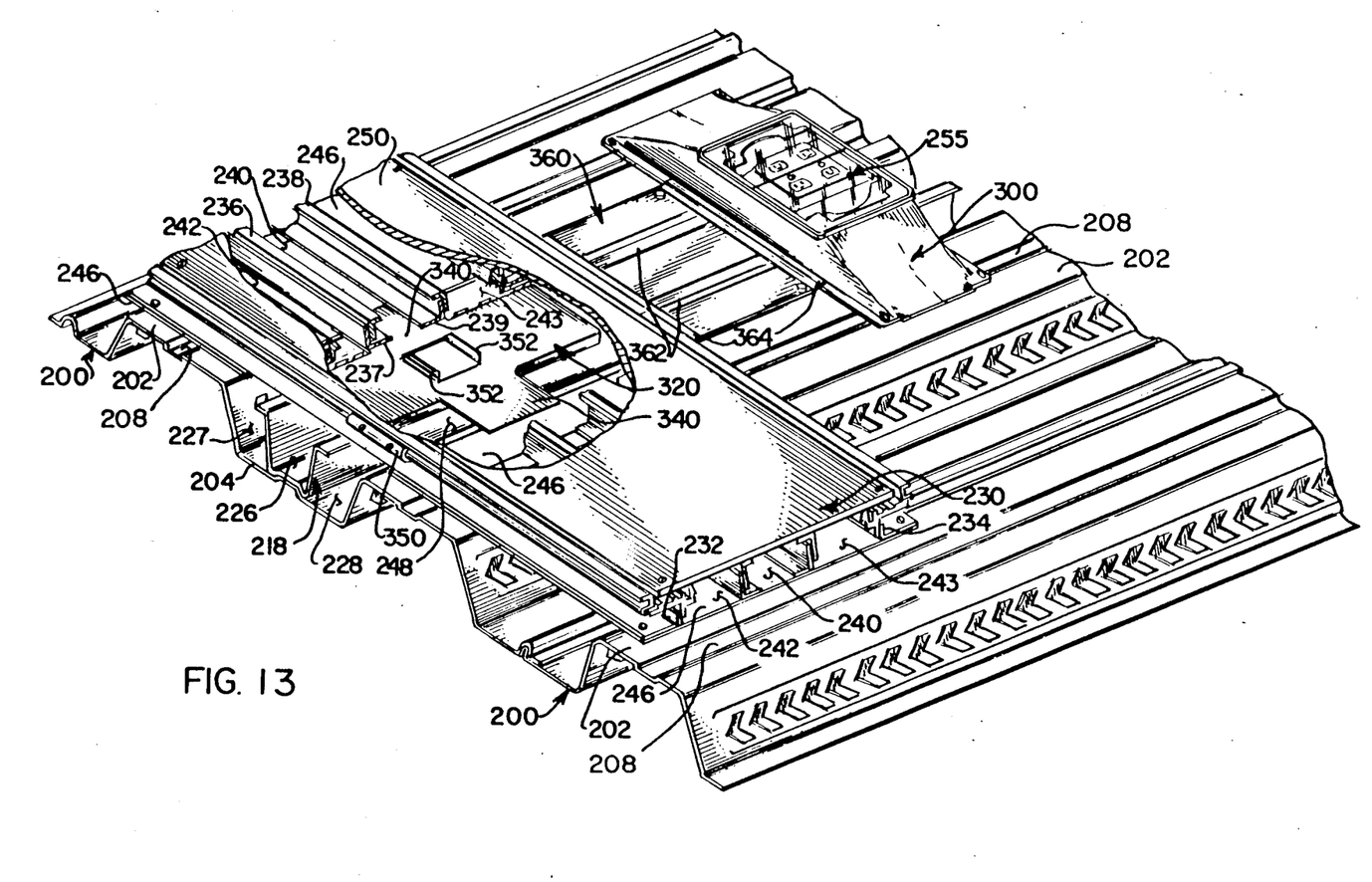
FIG. 13 is an isometric view partly in section of an entire cellular flooring system showing the interconnection of components shown in FIGS. 8 through 12 and a partly broken away covering means therefore.

FIG. 9 shows a single trench unit 230 which rests transversely across crest portions 202 of sheets 200. Two or more trench units 230 having a modular length may be coupled together in an end to end relationship as shown in FIG. 13, or a single trench unit may be designed to have the proper length. Trench unit 230 is comprised of two outer vertical wall members 232 and 234 and two inner vertical wall members 236 and 238. It is also contemplated that two or more wall members could be substituted by modified dividing members similar to those described above. Wall members 232, 234, 236 and 238 are each height adjustable and are provided in a parallel spaced-apart relationship so as to provide three parallel passageways 240, 242 and 243, each passageway having an open top and bottom surface. The bottom surface of passageways 240, 242 and 243 is closed by attached base sheet 246. As shown in the drawing, a gap 248 is provided in the base sheet at one end of trench unit 230 to provide unrestricted vertical access between conduits 226, 227 and 228 (shown in FIG. 8) and passageways 240, 242 and 243. Trench unit 230 is positioned on the crest portions 202 of sheet 200 so that its vertical wall members 232, 234, 236 and 238 extend transversely with respect to conduits 226, 227 and 228 and so that gap 248 is positioned directly above said conduits. Gap 248 may be created by removing at least a portion of the wall area of the passageways 240, 242 and 243 and conduits 226, 227 and 228 in the region where the passageways and the conduits are juxtaposed. If more than three passageways are required in the trench unit 230 additional interior wall members may be employed. A trench cover 250 (shown in FIG. 13) is removably attached over the entire length of the trench thereby fully enclosing passageways 240, 242 and 243. The final height of the trench can be adjusted by manipulating the wall members to accommodate any desired flooring thickness. Adjustments are made so that cover 250 is level with a layer of concrete which is provided over the corrugated sheets 200.

Figure 10:
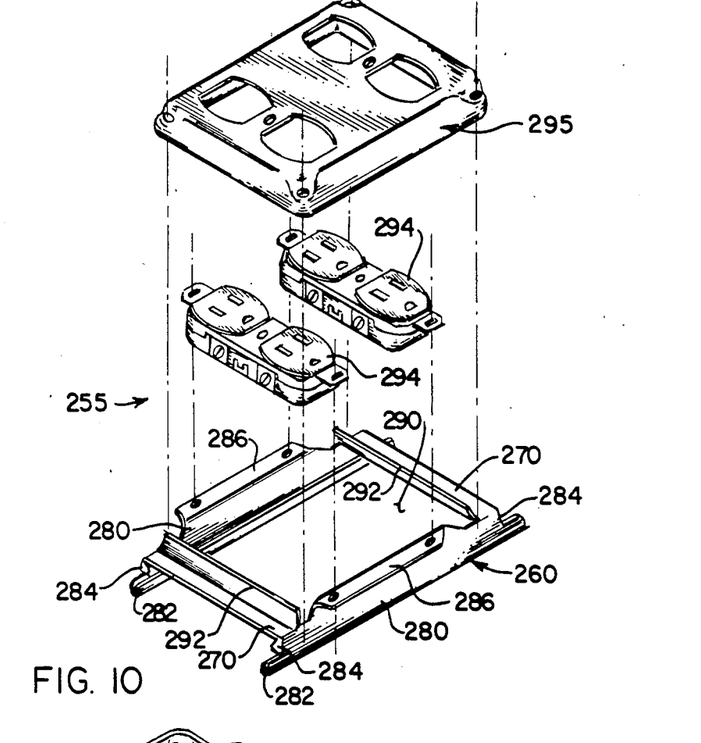
FIG. 10 is an isometric view in exploded form of a mounting tray and associated electrical receptacles; and cover plate.

FIG. 10 is an isometric view in exploded form of a mounting tray and associated electrical receptacle and cover plate referred to as mounting unit 255. The mounting tray 260 generally has the shape of an inverted "U" shaped channel having a top portion 270 and generally downwardly extending side portions 280. Lower extending edges 282 of side portions 280 are folded inwardly and upwardly through 180° of arc and are spaced at a distance to receive and engage extending wings 224 of "U" shaped dividing member 218 (FIG. 8). An inwardly extending tab 284 is provided at each end of side portions 280 approximately half way down from top 270. Tabs 284 are utilized to support the weight of tray 260 onto the extending wings 224 described above. It can be seen that tray 260 can easily be snapped onto separating member 218 at any point along its length where outlet receptacles might be required. Folded edges 282 prevent upward movement and tabs 284 prevent downward motion. Tray 260 can be moved longitudinally on dividing member 218 by sliding it on wings 224 thereby permitting easy alignment of the tray to a final position. Tray 260, in addition to providing a mounting bracket, also serves as an isolating means separating the power lines from other services. As will later be described, tray 260 is covered by an access housing which permits access to all of the conduits. An access opening 290 is provided in top portion 270 of tray 260 to receive electrical outlets and the like. The central portions of sides 280 of the tray extend upwardly above the top 270 and then outwardly to provide surfaces 286 which are used for mounting standard receptacle components 294 as shown. Edges 292 of the top surface 270 adjacent to opening 290 are formed upwardly so that no sharp metal edges extend into conduit 226 (FIG. 8). In fact, the entire cellular flooring system is designed so that no sharp edges can contact or damage the service lines placed into conduits or passageways. A standard cover plate 295 may be provided to enclose the space surrounding receptacles 294.

Figures 11, 12:
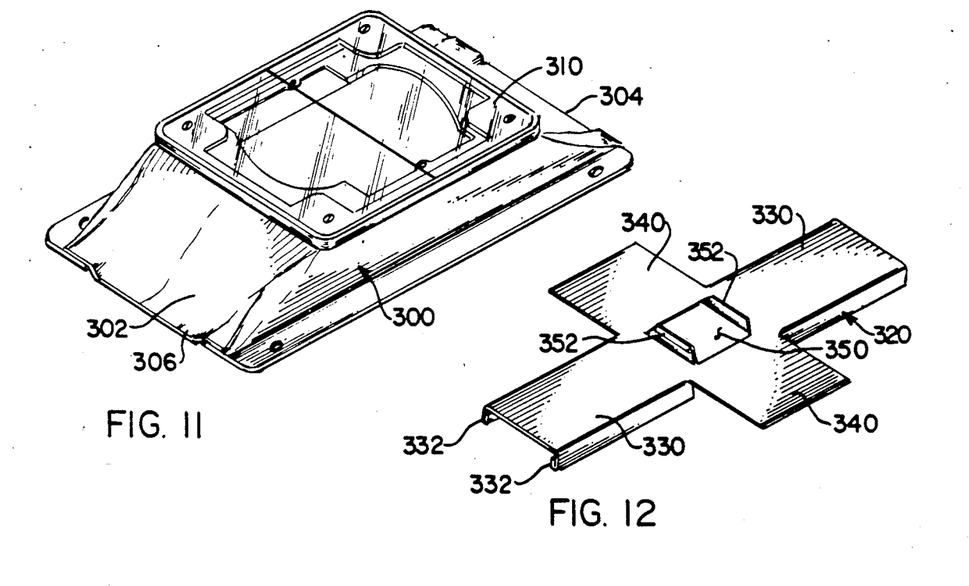
FIG. 11 is an isometric view of a service access housing unit.
FIG. 12 is an isometric view of a cross-shaped isolating member.

In FIG. 11 an access housing unit 300 is shown. The housing has a body portion 302 formed from sheet metal and a height adjustable top plate 310 for covering an opening provided in the housing. The body portion is designed to span across conduits 226, 227 and 228 as shown in FIG. 13 and is secured at ends 304 and 306 thereof to a crest 202 adjacent to said conduits. As mentioned, the body portion has an opening in its top surface to provide access to the underlying service lines which are placed in conduits 226, 227 and 228 and top plate 310 is height adjustable so that it can be leveled with a layer of concrete which is poured over corrugated sheets 200.

FIG. 12 is an isometric view of a cross-shaped isolating plate member 320. Member 320 has longitudinally extending portions 330 and transversely extending portions 340 extending outwardly from a central access opening 350. Portions 330 each have downwardly extending edges 332, a portion of which is folded inwardly and upwardly to provide a snap on engaging means to secure portions 330 to outwardly extending wings 224 of dividing member 218 in the same manner as edges 282 of mounting tray 260 described above in FIG. 6. Portions 330 provide a cover for conduit 226 in the portion of trench 230 where gap 248 is provided in trench base sheet 246. Transversely extending portions 340 of member 320 provide a base for the portion of trench passageway 240 which crosses over gap 248 in base sheet 246. Isolating member 320 therefore isolates conduit 226 and passageway 240 from all other conduits and passageways. Access opening 350 provides vertical access only between conduit 226 and passageway 240. Upwardly extending edges 352 of isolating member 320 are provided adjacent to access opening 350. Edges 352 are folded over to provide a snap-on engaging means for attaching said edges to inwardly extending portions 237 and 239 provided at the base of interior wall members 236 and 238 shown in FIG. 9. Therefore, isolating member 320 serves to isolate conduit 226 and passageway 240 and to lock trench 230 to separating or dividing member 218. Further, isolating member 320 eliminates any possibility of misalignment of dividing member 218 relative to the trench passageway 240. It is also noted that isolating member 320 is fastened to dividing member 218 and to trench 230 in a manner which allows it to slide longitudinally with respect to each of these components allowing for simplified installation and alignment.

It is contemplated that various other isolating members could be designed in accordance with the teachings of the present invention. In one such variation, a substantially square plate member having three approximately spaced access openings arranged diagonally therein, could effectively isolate each of three connected conduit-passageway pairs from the others. In this case, the two outermost openings could be formed by cutting away two diagonally opposed corner portions of the plate. In this embodiment, the isolating means provides three uncovered portions in the region where the passageways and conduits are juxtaposed.

As clearly shown in FIG. 13, the present invention provides a cellular flooring system of the type having a plurality of longitudinally extending parallel conduits 226, 227 and 228 provided on a first horizontal level, at least a portion of said conduits being formed by portions of corrugated metal decking sheets 200.

The present invention also provides an overlying trench unit 230 which is supported by said decking sheets 200 on a second horizontal level vertically disposed above said first level. Trench unit 230 has a plurality of adjacent parallel passageways 240, 242 and 243 which cross over and extend transversely with respect to conduits 226, 227 and 228. Trench unit 230 is provided with a base portion 246 which extends substantially the length of the trench unit. Base 246 has a generally rectangular opening 243 therein which is positioned in and extends substantially throughout the region where the passageways and conduits are juxtaposed to allow for communication and for substantially unrestricted vertical access between the passageways and conduits.

The present invention also provides a separate isolating means 320 in the form of a substantially flat plate member adapted to be positioned within the rectangular opening and to be removably attached to the trench unit in a substantially coplanar relationship with said base portion 246. Isolating means 320 is formed to have a shape whereby said isolating means partially covers said rectangular opening 248 and acts as a complete barrier between some, but not all, of the juxtaposed passageways and conduits, such as, for example, passageway 240 and conduit 228. Isolating means 320 also allows for isolated access between at least one passageway and at least one conduit, such as, for example, between passageway 240 and conduit 226 through opening 350.

Referring now to FIG. 13 a completely assembled cellular flooring system is illustrated. A plurality of corrugated sheets 200 are attached together as described in FIG. 8. A "U" shaped dividing member 218 placed into valley 204 provides three parallel conduits 226, 227 and 228; each conduit having an open top surface. An isolating member 320 is placed over conduit 226 in the center of the location where the overlying trench 230 will be provided. A trench unit 230 having a base sheet 246 and an open top surface is placed over isolating member 320 so that transversely extending portions 340 of member 320 span the gap 248 in base sheet 246 and so portions 237 and 239 of interior trench wall 236 and 238 extend across and engage portions 352 of isolating member 320. It is to be understood that the trench and dividing member are locked together by the isolating member by means of a simple snap on process and that all of the above components are provided in standard modular lengths and, therefore, are easily assembled at the job site.

A single trench comprised of one or more trench units 230 preferably extends from one end of a structure to another serves as the main feeder for all service lines. If more than one trench unit is utilized two or more trench units 230 can be easily coupled together in an end to end relationship with clips 350 as shown. A gap 248 need only be provided in the trench base sheets which cross over divided or separated valleys; otherwise, trench base 246 extends the full length of the trench wall members. Outer trench walls are attached to the crest portions 202 of corrugated sheets 200 by sheet metal screws or any other suitable means.

Once the valleys are separated and the trench is in place, we prefer to place all of the service lines into their respective passageways and conduits to avoid the feeding process described above. Receptacle mounting units 255 containing any desired outlet hardware are then snapped onto the separating member 218 at all desired locations along the separated valley. Access housings 300 are mounted over the mounting units 255 onto crests 202 as shown. All remaining exposed conduits are covered by covers 360. Covers 360 have two sets of spaced-apart depressions 362 therein formed to receive the wings 224 of separating member 218 to aid in properly aligning the covers 360 over the conduits and to help cover the sharp metal edges of the wings. Ends 364 of covers 360 are slightly elevated so that they may overlap the base portion of the access housing 300 and outer trench walls 232 and 234, again covering sharp metal edges. Top covers 250 are also provided on trench 230.

From the foregoing description of the current invention, it is our desire to make clear that we prefer to provide standard sized corrugated sheets which may be fabricated in quantity, compactly nestled, shipped in bundles, installed as received from the factory and which may be placed at any location without regard to a floor plan. Of course, cutting of the sheets may be required to fill in the exact dimensions as the floor is closed. We also prefer to provide standardized dividing members, isolating plates, trench members, access housings and covers to be used in conjunction with the sheets. Since no special fabrication is required, each of the above components can be efficiently mass produced at a reduced cost. We provide further cost savings by placing service lines into open conduits before they are covered, thereby eliminating the need for fishing the lines through enclosed cells. Eliminating the fishing process reduces the risk of damaging the lines and reduces the wiring time.

We provide an underfloor wiring system in which a relatively small number of standard components can be easily assembled in the field and each of which can be fabricated out of sheet metal rather than more expensive castings. By utilizing only valleys for service raceways, we have eliminated the need for a base sheet attached beneath the corrugated sheet. This reduces trapped air spaces and reduces the likelihood and severity of fires. We provide access to a plurality of services at a single access location while keeping desired service lines isolated from others. We provide a trench which has a base sheet except for where the trench crosses over the service conduits to allow concrete to flow under the trench into the valleys not being utilized by raceways. Providing concrete around the conduits and passageways provides greater fire protection than flooring systems which utilize bottomless trenches because those systems place service lines directly on the crests where there is nothing to prevent rapid conduction of heat throughout the corrugated sheet.

While we have illustrated and described certain present preferred embodiments of the invention and methods of practicing the same it is to be understood that the invention is not limited thereto and may be otherwise variously practiced within the scope of the following claims.

We claim:

1. In a cellular flooring system of the type having a plurality of longitudinally extending parallel conduits provided on a first horizontal level, at least a portion of said conduits being formed by portions of corrugated metal decking sheets, and an overlying trench unit having a length and supported by said decking sheets on a second horizontal level disposed vertically above said first level, said trench unit having a plurality of adjacent parallel passageways crossing over and extending transversely with respect to said conduits and creating a region where the passageways and conduits are juxtaposed the improvement which comprises:
    (a) said trench unit having a base portion extending substantially the length of the trench with a generally rectangular opening therein extending substantially throughout the region where the passageways and conduits are juxtaposed to allow for communication and for substantially unrestricted vertical access between the passageways and conduits and;
    (b) separate isolating means in the form of a substantially flat plate member adapted to be positioned within the rectangular opening and to be removably attached to said trench unit in a substantially coplanar relationship with said base portion said isolating means having a shape whereby said isolating means partially covers said rectangular opening and acts as a complete isolating barrier between some, but not all, of the juxtaposed passageways and conduits and said isolating means provides at least one uncovered portion of said rectangular opening to allow for isolated access between at least one passageway and at least one conduit.

2. A cellular flooring system according to claim 1 wherein a plurality of uncovered portions of said rectangular opening are provided between the passageways and conduits by said isolating means whereby one of said uncovered portions allows for isolated access between a single passageway and a single conduit and the remaining uncovered portions each allow for access between at least one of the remaining passageways and at least one of the remaining conduits.

3. A cellular flooring system according to claim 1 wherein a plurality of uncovered portions of said rectangular opening are provided between the passageways and conduits in a manner whereby each of said uncovered portions allows for isolated access between a single passageway and a single conduit.

4. A cellular flooring system according to claim 1 wherein edges of said isolating means are adapted for use in attaching said isolating means to said trench unit.

5. A cellular flooring system according to claim 1 wherein edges of said isolating means adjacent to an uncovered portion are adapted for use in attaching said isolating means to said conduits.

6. A cellular flooring system according to claim 1 wherein selected edges of said isolating means are folded over thereby eliminating sharp edges which could damage service lines and the like.

7. A cellular flooring system according to claim 1 wherein portions of said isolating means are adapted for use in adjustably attaching said isolating means to both said trench unit and said conduits in a manner whereby said isolating means may slide longitudinally with respect to said trench unit and to said conduits.

8. A cellular flooring system according to claim 2 wherein said plate member has a generally cross shaped configuration with an opening provided in the center of the cross.

* * * * *

UNITED STATES PATENT AND TRADEMARK OFFICE
CERTIFICATE OF CORRECTION

PATENT NO. : 4,682,456

DATED : July 28, 1987

INVENTOR(S) : THOMAS W. HARTMAN, THOMAS G. RYAN

It is certified that error appears in the above-identified patent and that said Letters Patent is hereby corrected as shown below:

In [57] Abstract, line 18, change "sheet" to --sheets--.

Column 2, line 16, change "additionally" to --Additionally--.

Column 4, line 40, insert --:-- after "which".

Column 12, line 40, after "portion" insert --,--.

Column 12, line 46, change "rectengular" to --rectangular--.

Signed and Sealed this

Eighth Day of December, 1987

Attest:

DONALD J. QUIGG

*Attesting Officer*       *Commissioner of Patents and Trademarks*